(12) United States Patent
Kuwamoto et al.

(10) Patent No.: US 11,126,412 B2
(45) Date of Patent: Sep. 21, 2021

(54) TOOL WITH MULTI-EDIT FUNCTION

(71) Applicant: Figma, Inc., San Francisco, CA (US)

(72) Inventors: Sho Kuwamoto, San Francisco, CA (US); Nikolas Klein, San Francisco, CA (US); Rasmus Mathias Andersson, San Francisco, CA (US); Bradee Evans, San Francisco, CA (US)

(73) Assignee: Figma, Inc., San Francisco, CA (US)

( * ) Notice: Subject to any disclaimer, the term of this patent is extended or adjusted under 35 U.S.C. 154(b) by 0 days.

(21) Appl. No.: 16/883,002

(22) Filed: May 26, 2020

(65) Prior Publication Data

US 2020/0371758 A1 Nov. 26, 2020

Related U.S. Application Data

(60) Provisional application No. 62/852,954, filed on May 24, 2019.

(51) Int. Cl.
*G06F 8/38* (2018.01)
*G06F 8/34* (2018.01)

(52) U.S. Cl.
CPC . *G06F 8/38* (2013.01); *G06F 8/34* (2013.01)

(58) Field of Classification Search
CPC ..................................... G06F 8/34; G06F 8/38
See application file for complete search history.

(56) References Cited

U.S. PATENT DOCUMENTS

| | | | | |
|---|---|---|---|---|
| 5,760,788 A | * | 6/1998 | Chainini | ............ G09B 19/0053 345/474 |
| 5,862,372 A | * | 1/1999 | Morris | ....................... G06F 8/34 715/769 |
| 2003/0004724 A1 | * | 1/2003 | Kahn | ..................... G10L 15/063 704/260 |
| 2005/0144571 A1 | * | 6/2005 | Loverin | ................ G06F 3/0481 715/822 |

(Continued)

OTHER PUBLICATIONS

The International Searching Authority, "Search Report" in application No. PCT/US2020/034503, dated Jul. 28, 2020, 13 pages.

(Continued)

*Primary Examiner* — Matthew Ell
(74) *Attorney, Agent, or Firm* — Hickman Becker Bingham Ledesma LLP

(57) ABSTRACT

Computer-implemented design tool functions are described herein for automatically performing edits across different portions of one or more design layouts. According to an example, a method includes causing a display device to display a design interface used to edit a design layout, which includes at least a first frame and a second frame. The method includes receiving first input to initiate a multi-edit mode in the design interface and receiving second input to perform a first operation to edit a first node in the first frame. The method further includes identifying, based at least in part on the second input, a second node in the second frame and corresponding to the first node in the first frame. In this example, the method includes performing, based at least in (Continued)

part on the second input, the first operation to edit the first node in the first frame and a second operation to edit the second node in the second frame.

22 Claims, 10 Drawing Sheets

(56) References Cited

U.S. PATENT DOCUMENTS

| | | | |
|---|---|---|---|
| 2006/0136844 A1* | 6/2006 | Zhang | G06F 9/451 |
| | | | 715/837 |
| 2008/0303819 A1* | 12/2008 | Latour | G06T 11/206 |
| | | | 345/440 |
| 2011/0266426 A1 | 11/2011 | Kikuchi | |
| 2012/0042242 A1* | 2/2012 | Garland | G06F 40/111 |
| | | | 715/256 |
| 2013/0055126 A1 | 2/2013 | Jackson et al. | |
| 2013/0329129 A1 | 12/2013 | Gupta et al. | |
| 2014/0072281 A1 | 3/2014 | Cho | |
| 2016/0124599 A1* | 5/2016 | Joo | G06F 1/1643 |
| | | | 715/748 |
| 2017/0186241 A1 | 6/2017 | Zavesky | |
| 2020/0371753 A1* | 11/2020 | Dhawal | G06F 8/34 |

OTHER PUBLICATIONS

Current Claims in application No. PCT/US2020/034503, dated Jul. 2020, 4 pages.

* cited by examiner

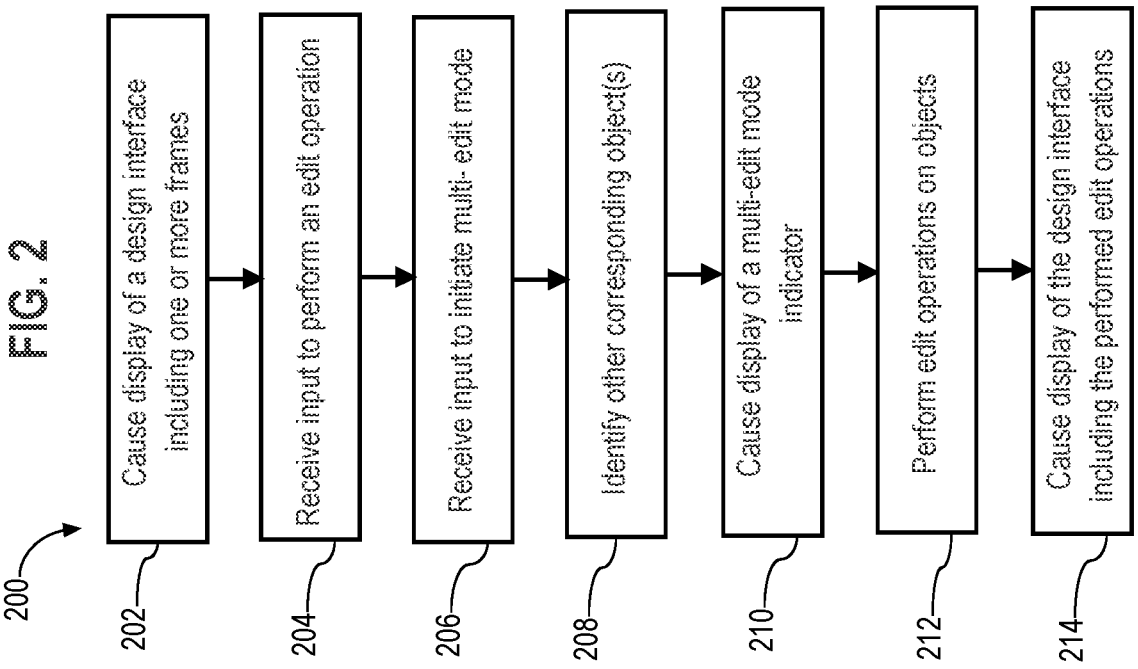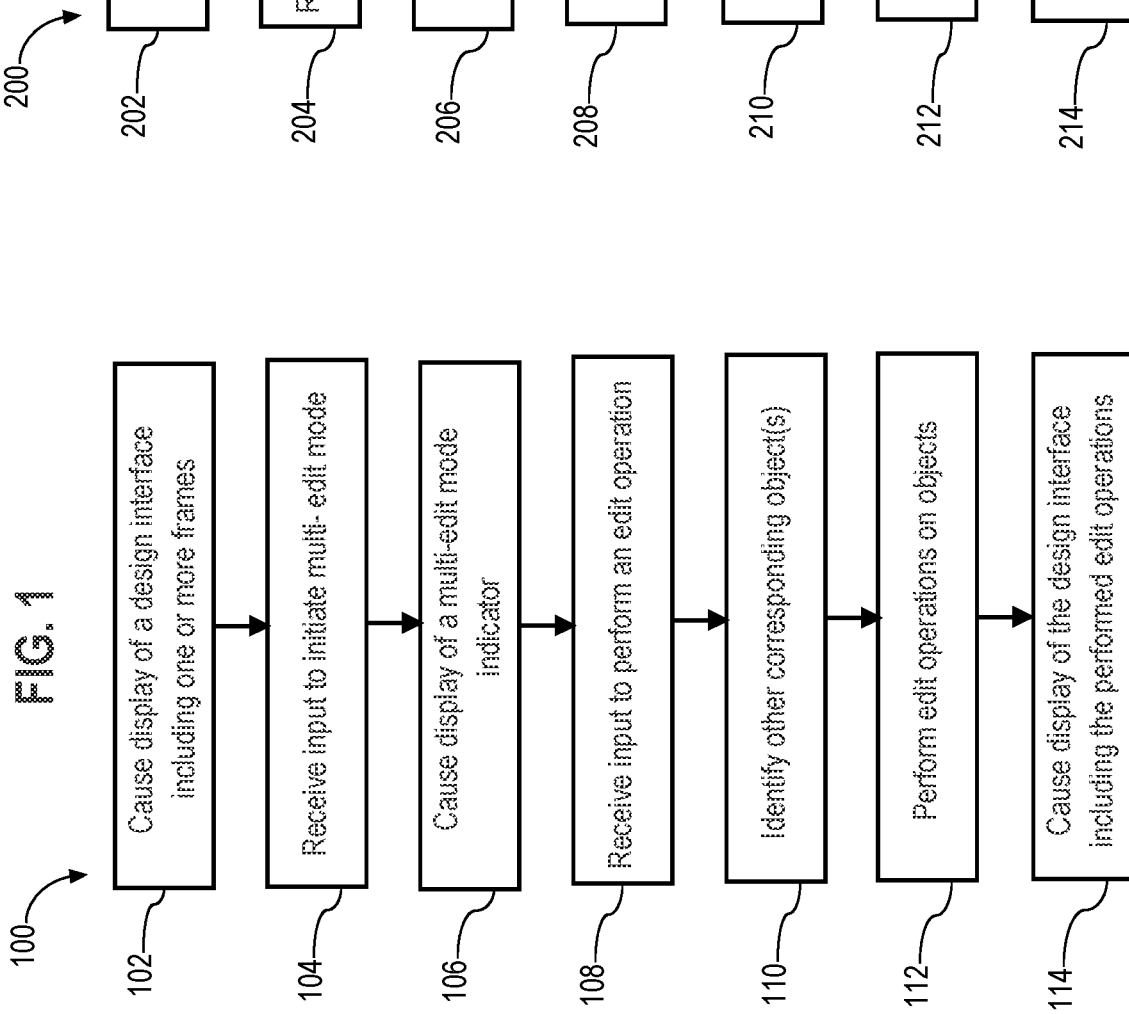

TOOL WITH MULTI-EDIT FUNCTION

BENEFIT CLAIM

This application claims the benefit under 35 U.S.C. § 119(e) of provisional application 62/852,954 filed May 24, 2019, the entire contents of which are hereby incorporated by reference for all purposes as if fully set forth herein.

FIELD OF THE DISCLOSURE

The present disclosure relates to a design tool, and more particularly to a computer-implemented design tool including features to computer-automate multiple edits across portions of one or more design layouts.

BACKGROUND

A designer uses computer-implemented design tools to create a design, layout, or interface for a wide variety of applications, such as, for different possible designs or states of a graphical user interface or one or more elements thereof, a logical flow through an application represented by a series of screens, a slide deck, and/or some other arrangement of data or other content. Computer-implemented design tools help to facilitate various aspects of the creation process, however, some aspects remain tedious. For instance, a design document may have multiple screens or pages that represent a series of states of a design layout, and substantial portions of the design layout may be the same or substantially similar across different screens. To edit such a design document, and in particular, the same or similar portions, a designer would spend considerable time and effort arranging and editing objects in a portion of one page of the design layout and providing separate and repetitive inputs to replicate any changes to the same or similar portions of potentially many other pages of the design layout.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiments of the present disclosure are illustrated by way of example, and not in way by limitation, in the figures of the accompanying drawings and in which like reference numerals refer to similar elements.

FIG. 1 is a flowchart for providing computer-implemented design tool functions according to an embodiment.

FIG. 2 is a flowchart for providing computer-implemented design tool functions according to an embodiment.

DESCRIPTION OF EXAMPLE EMBODIMENTS

Figure 3:
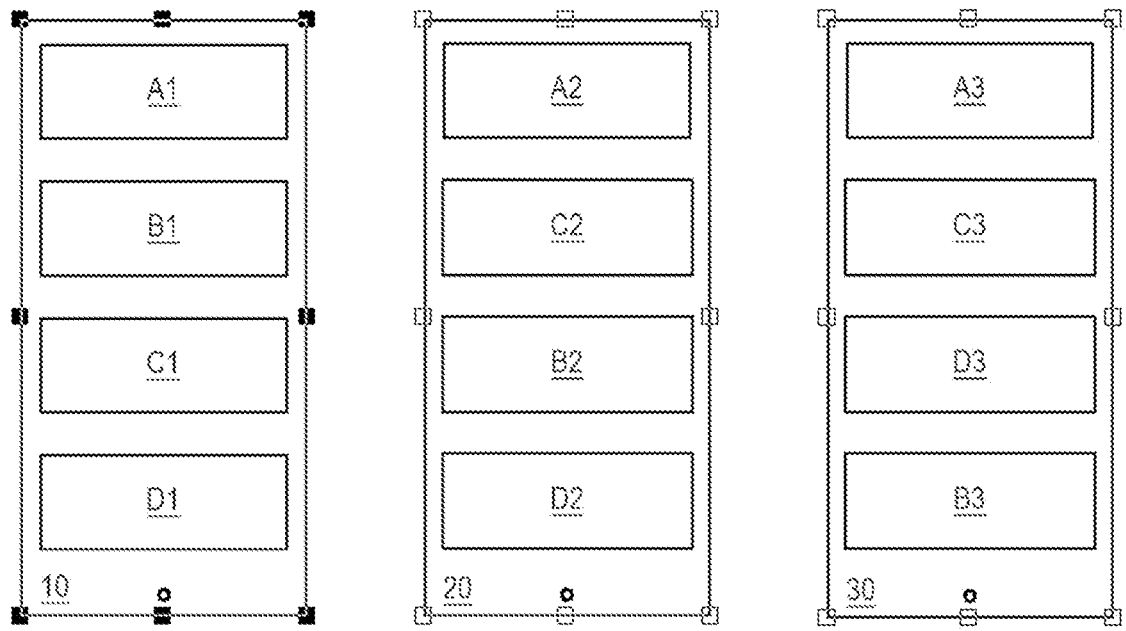
FIG. 3 illustrates an example including an arrangement of frames and objects and an input to initiate a multi-edit mode.

In the following description, for the purposes of explanation, numerous specific details are set forth in order to provide a thorough understanding of the example embodiments of the present disclosure. It will be apparent, however, that the example embodiments may be practiced without these specific details. In other instances, well-known structures and devices are shown in block diagram form in order to avoid unnecessarily obscuring the example embodiments.

General Overview

Computer-implemented design tool functions are described herein for editing particular content in a design layout and performing computer-automated, same or similar edits to corresponding content in other portions of the design layout.

In an embodiment, a computing device is configured to provide a design tool. The computing device controls a display device to display a design interface of the design tool to facilitate interaction therewith. The design interface provides functions and controls to create and edit a design layout. Generally, a design layout includes one or more frames, objects, and/or nodes. A frame is a container that holds part of the design layout, and may include objects and nested frames. An object corresponds to a design element, such as a text container, shape, border, media element or other content, input control, or navigational component. A node corresponds to a portion of the design layout and may represent an object, frame, or a position where an object or frame is to be placed, for example.

According to an example, a design layout includes a first frame and a second frame. A computing device provides a design interface via, at least in part, a display device. The design interface provides a field-of-view that can be controlled to include various portions of the design layout. In the present example, the field-of-view includes at least a portion of the first frame, and may include a portion of the second frame. However, the second frame may also be partially or entirely outside the field-of-view. The computing device receives an instruction to initiate a multi-edit mode in the design interface. The instruction may include a user-input and/or be computer-automated, at least in part. The computing device may, based at least in part on the instruction, cause the display device to display the design interface including an indicator that the multi-edit mode has been activated to edit together the first frame and the second frame. While in the multi-edit mode, the computing device receives an input to perform a first edit operation to edit a first node in the first frame. The first edit operation may be to create and position a first object at the first node in the first frame or to modify an existing first object at the first node in the first frame, for example.

In this example, the computing device identifies, based at least in part on the input, a second node in the second frame that corresponds to the first node in the first frame. The computing device performs, based at least in part on the input, the first edit operation to edit the first node in the first frame and a second edit operation to edit the second node in the second frame. In this example, the second edit operation is a same or similar operation as the first edit operation, and the computing device automatically performs the second edit operation without additional input directly on or associated with the second node. The computing device may cause the display device to display the field-of-view of the design interface that includes the first frame with the first edit operation performed on the first node and the second frame with the second edit operation performed on the second node. In other examples, however, the second frame is in a different field-of-view, tab, page, or document from the first frame and may not be displayed together with the first frame.

According to another example of the multi-edit mode, the design tool is configured to propagate edits to other frames after an edit has been performed on an initial frame. An example of this functionality is similar to the above example, in which a computing device provides a design interface via, at least in part, a display device, and the design interface provides a field-of-view including at least a portion of a first frame. In this example, the computing device receives an input to perform a first edit operation to edit a first node in the first frame. The first edit operation may be to create and position a first object at the first node in the first frame or to modify an existing first object at the first node in the first frame, for example.

Based on the first input, the computing device performs the first edit operation to edit the first node, and may cause the display device to display the field-of-view of the design interface including the first edit operation performed on the first node. After or in response to performing the first edit operation, the computing device receives an instruction to initiate a multi-edit mode based on the first edit operation on the first node. This instruction may include a user-input and/or be computer-automated, at least in part. Based on the instruction, the computing device identifies a second node that corresponds to the first node, and automatically performs a second edit operation to edit the second node without additional input directly on or associated with the second node. The second node may be in the same first frame or in a different frame. The second edit operation is a same or similar operation as the first edit operation. The computing device may cause the display device to display the field-of-view of the design interface that includes the second edit operation performed on the second node. In other examples, however, the second object is in a different field-of-view, tab, page, or document from the first object and may not be displayed together with the first frame.

These and other techniques described herein provide improvements in the technical field of computer-implemented design tools by adding multi-edit functionality to automatically perform edits across potentially many frames and objects throughout one or more design layouts, which helps to reduce the need for repetitive, tedious, and imprecise inputs from a designer.

Computer-Implemented Design Tool Functions

FIG. 1 is a flowchart 100 for providing computer-implemented design tool functions according to an embodiment. The flowchart 100 of FIG. 1 may be implemented by a computing device, such as a computing device 1600 of FIG. 16. The computing device includes a software system, such as the software system 1700 of FIG. 17. The computing device utilizes the software system to execute instructions to provide a computer-implemented design tool that includes a design interface displayed on a display device. The computing device receives input from one or more input devices to control functionality of the design tool. The computing device may provide the design tool as an application executing on the computing device, and/or may execute instructions that are received from another computing device, such as an application server connected to the computing device through a wired or wireless network. In this context, a computing device as referred to herein may include one or more computing devices, for example, a single computing device or multiple computing devices in a cloud-based system.

At block 102, a computing device causes a display device to display a design interface or graphical user interface (GUI) of the design tool. A designer interacts with the design tool via one or more input devices operatively coupled to the computing device and the GUI to create and edit a design layout. In practice, a design layout may include numerous frames and objects within the frames, and potentially other nested frames within frames and objects within the nested frames. A frame serves as a container for one or more objects and/or other frames. An object may be an ornamental element, a functional element, or serve as a container or placeholder for text, a media element, or other content, for example. Frames and objects may practically have any desired shape, size, and style.

At block 104, the computing device receives input to initiate a multi-edit mode via the GUI. In the multi-edit mode, the design tool performs computer-automated edit operations across a set of frames. For example, a first edit operation to a particular frame is replicated and performed similarly, automatically, and simultaneously across other frames of the set of frames. The set of frames may include frames in the same field-of-view as the particular frame and/or frames outside the same field-of view. The set of frames may also include frames in other tabs, pages, or document from the particular frame. In an example, the input to initiate the multi-edit mode includes a selection of multiple frames in the design layout to edit together. In another example, the input includes a selection of one or more frames and a computer-automated selection of one or more other frames in the design layout to edit together.

The computing device may automate the selection of one or more frames based, for example, on receiving a selection of a first frame and identifying other frames that share one or more characteristics with the selected frame. Illustratively, a user-selected frame and a computer-selected frame may have associated identifiers or other corresponding metadata, may share at least some content (e.g., nested frames and/or objects), and/or have a common edit or duplication history.

In a further example, the input includes a selection of a single object in a frame and a computer-automated selection of related or linked objects within the same frame or across one or more other frames. The computing device automates the selection of one or more objects based, for example, on receiving a selection of a first object and identifying other objects that share one or more characteristics with the selected object. Illustratively, a user-selected object and the computer-selected object may have associated identifiers or other corresponding metadata, may share at least some content (text, images, shapes, etc.) or have a common edit history.

In an embodiment, information is associated with each node, which refers also to frames and objects, and the information helps track whether the node is a duplicate of an original node. For example, the information may include an ID of the original node, a serial number that tracks how many times a node has been duplicated, and/or an entire duplication history that results in the creation of the node. The computing device may use this information to select similar nodes to edit together, and such similar nodes may be located on one or more pages and across multiple documents. The computing device may also cause the display device to display this information (e.g., "node X in frame A is a duplicate of node Y in frame B"). In an example, the information is provided in a GUI to allow a user to modify the information, and to search for similar nodes across pages and documents.

In an example, the selection of the set of frames automatically initiates the multi-edit mode over the set of frames. In another example, a designer and/or computing device selects the set of frames and the designer performs an additional action to confirm the selection of the set of frames and initiate the multi-edit mode on the set of frames. The additional action may include a keyboard input (e.g., pressing <enter>), selecting a menu action displayed by the display device, or some other combination of one or more actions provided via one or more input components.

At block 106, the computing device causes the display device to display an indicator to inform a designer that the multi-edit mode is initiated on the selected set of one or more frames. The indicator focuses on the set of one or more frames and may take the form of a highlighted border around the frames that is characterized, for example, by an increased line thickness, a different color, and/or a distinct border style. In an embodiment, the computing device, at block 106, also causes the display device to display another indictor to highlight a primary focused frame. This other indicator can be another distinct border characteristic and informs a designer that edits in the primary focused frame will be replicated to other frames of the selected set of frames. In a further embodiment, the display device does not display all selected frames together at once. One or more of the selected frames, for instance, may be located in a different field-of-view, tab, page, or document from a displayed subset of the one or more frames. In an example, the computing device causes the display device to display a match count in the GUI when hovering over or selecting frames to be included in the multi-edit mode. The match count informs the designer how many other frames are included in the set of frames to be edited in the multi-edit mode. In another example, the computing device causes the display device to display some other indication (such as an arrow pointing offscreen) of other frames that are not displayed but are included in the set of frames to be edited in the multi-edit mode.

At block 108, the computing device receives input to perform an edit operation to edit a particular frame. The computing device may provide controls for receiving input to perform the edit operation. The controls may include a combination of controls that are displayed with the design layout in the GUI of the design tool, and controls that are not displayed but provided by keyboard actions or other input interactions (e.g., mouse cursor clicks and movements). In an embodiment, the computing device at block 108 provides unique controls for performing operations within the multi-edit mode that would otherwise not be available.

The edit operation, for instance, may be to edit a particular object within the particular frame. Illustratively, the edit operation may include setting a property of an object (such as a fill color or border style), adding or modifying text in an object, moving an object (such as by using arrow keys on a keyboard or by using a mouse to click-on and drag an object), scaling or resizing or changing a shape of an object, creating and placing a new object, deleting an object, and/or duplicating an object. According to an embodiment, the input at block 108 is an input provided through one or more input devices that are operatively coupled to the computing device.

In an embodiment, the design tool provides one or more keyboard navigation features that are useful when replicating edit operations across multiple frames. A designer may utilize the keyboard navigations features in relation to block 104 to aid in selecting the set of frames to be edited in the multi-edit mode, and/or in relation to block 108 to select collections of one or more objects to be edited. The keyboard navigation features include, for example, a command (e.g., command-A) to select everything inside all selected frames, a keyboard shortcut to navigate to a "next" and/or "previous" object within each selected frame and/or to an object that is above/below/left/right of a current selection, and a quick search command to search within one or more frames (e.g., to search for objects associated with a particular name or identifier). A next or previous object may be determined based on a left-to-right, top-to-bottom relative position of objects within a frame, a front-to-back layering of objects within a frame, and/or a history including a sequence operations performed to create and edit objects.

At block 110, the computing device proceeds, in response to receiving the edit operation at block 108 (the "first" edit operation), to identify one or more other (or "second") objects in the set of frames that correspond to a first object to be edited by the first edit operation. The computing device identifies the corresponding second objects to determine one or more other (or "second") edit operations to be performed across the set of frames to replicate the first edit operation. At block 110, the computing device may identify the one or more second objects automatically and without user interaction. Although, the computing device may also be configured to receive another input that instructs the computing device to proceed to identify the one or more second objects and second edit operations before otherwise automatically proceeding to do so.

In an example, at block 110, the computing device identifies the first object to be edited by the first edit operation of block 108. At block 110, the computing device identifies one or more second objects across the set of frames that are the same, similar, or otherwise linked to the first object. The computing device identifies linked objects based on one or more criteria. For example, the computing device may identify that a second object is linked to a first object if the objects have the same click position. Illustratively, objects may have the same click position if the first object is at a position relative to the first frame that matches, overlaps, or otherwise corresponds with a position of the second object relative to its respective frame. Other criteria include the first object and the second object having, at least in part, matching content. For example, matching content may include aspects of textual content, object design (e.g., shape, style, size, or color), or some other visual characteristic of the objects.

Linking criteria may also include the first object and the second object having one or more of a corresponding object name or identifier (ID), a corresponding order characteristic, or a corresponding hierarchy characteristic. In an example, the design tool assigns an ID to an object when it is created. When an object is duplicated, for instance, the design tool assigns an ID that corresponds with or references the ID of the original object, such that the duplicated object is linked to the original. A designer may also edit the IDs of otherwise distinct objects to link the objects. Objects may have a corresponding order characteristic based on a relative position or a logical order of the objects in a frame. Objects in different frames may be linked by corresponding relative position by both being, for example, the third object from a top of a respective frame. In another example, objects in two distinct frames may be linked by corresponding logical order by both being in a background layer of a respective frame. Further, objects may have a corresponding hierarchy characteristic if the objects are arranged in a same subdivided portion of a frame or design layout, such as, by being arranged in a header portion, a tab section, or a border area of a frame or design layout.

At block 112, the computing device causes the design tool to perform the first edit operation of block 108 on the particular frame, and to perform one or more second edit operations on the one or more second objects identified at block 110. According to an embodiment, at block 112, the computing device performs the first edit operation and the one or more second edit operations automatically and without distinct input from the designer on the one or more second objects. The computing device performs the one or more second edit operations according to various rules. For instance, when the first edit operation changes a property of an object (e.g., a fill color), the one or more second edit operations makes the same property change to the one or more second objects. When the first edit operation edits text in the first object, the one or more second edit operations edit text in the one or more second objects in like manner. When the first edit operation scales or resizes the first item, the one or more second edit operations scale or resize the one or more second objects in like manner, such as by using pixel offsets or proportional adjustments (e.g., the first object and the one or more second objects are each made 40% larger). When the first edit operation deletes the first object, the one or more second edit operations delete the corresponding one or more second objects. When the first edit operation creates a new first object, the one or more second edit operations create one or more new second objects each being the same as the first object and placed at the same position relative to the respective frames.

According to an embodiment, when the first edit operation duplicates the first object, the one or more second edit operations duplicate each second object separately into its respective frame. This rule may apply when the first edit operation to duplicate is initiated with a command-D function, option-drag function, a copy and paste operation, or other similar command. The design tool is also configured to receive a selection of a text range within a first object, and when the first edit operation duplicates the selected text range in the first object (e.g., in response to a copy and paste operation), the one or more second operations separately duplicate corresponding text ranges from the one or more second objects and insert the duplicated text ranges into respective one or more second objects of one or more second frames. In another embodiment, when the first edit operation duplicates the first object, the one or more second edit operations also duplicate the first object and place the duplicated first object at positions relative to each second object in respective frames.

When the first edit operation moves the first object via arrow key inputs, the one or more second edit operations similarly move the one or more second objects in a relative manner (e.g., the first object and the one or more second objects are each moved to the right by 8 pixels). When the first edit operation moves the first object via mouse inputs, the one or more second edit operations similarly move the one or more second objects in an absolute way (e.g., the first object and the one or more second objects are each moved to the same relative position in the respective frames). Object movement rules may also be changed between relative movements and absolute movements, as needed or desired by a designer.

At block 114, the computing device causes the display device to display the design interface including the first frame with the first operation performed on the first object. The display device may also display the one or more second frames with the one or more second edit operations performed on the one or more second objects. However, in some instances, one or more of the second frame(s) that are edited together with the first frame in the multi-edit mode are not displayed together at block 114.

FIG. 2 is a flowchart 200 for providing computer-implemented design tool functions according to an embodiment. According to FIG. 2, a computing device applies many of the aspects discussed in relation to FIG. 1, but differs in that a first edit operation is performed first and then subsequently replicated across a set of other similar or linked frames.

At block 202, a computing device causes a display device to display a design interface or GUI as in block 102 described above. At block 204, the computing device receives input to perform a first edit operation to edit a first frame similarly to block 108 described above. At block 204, however, the computing device proceeds to perform the first edit operation to edit the first frame.

At block 206, the computing device receives input to replicate the first edit operation in a multi-edit mode to a set of other frames. This input to replicate the first operation may include, for example, a selection of a first object edited by the first edit operation, and a command to replicate the first operation in the multi-edit mode.

At block 208, the computing device, in response to receiving the input at block 206, identifies one or more other (or "second") objects that correspond to the first object. According to an embodiment, the computing device identifies a set of frames similarly to block 104, and identifies the one or more second objects similarly to block 110.

At block 210, the computing device causes the display device to display an indicator to inform a designer that the multi-edit mode will be initiated on the frames and objects identified at block 208. The computing device may cause this display similarly to block 106.

At block 212, the computing device causes the design tool to perform one or more second edit operations to replicate the first edit operation to the set of other frames and objects similar to block 112.

And, at block 214, the computing device causes the display device to display the design interface including the first frame with the first operation performed on the first object. The display device may also display the second frame with the second operation performed on the second object similarly to block 114.

Example Multi-Edit Functions and Design Layouts

FIG. 3 illustrates an example including an arrangement of frames and objects and an input to initiate a multi-edit mode. FIG. 3 includes an arrangement of frames 10, 20, 30 and blocks A1, A2, A3, B1, B2, B3, C1, C2, C3, D1, D2, D2 within the frames. The blocks in the frames 10, 20, 30 may represent objects and/or nested frames, which include further objects and/or nested frames. In this example, the input to initiate the multi-edit mode includes a selection of the frames 10, 20, 30, as indicated by the blocks spaced around borders of the frames. The computing device receives the selection of the frames 10, 20, 30 in a suitable manner, such as by input that defines a shape around the frames or by input that individually selects each frame. Defining a shape may be performed by a mouse click action at a first location of a cursor, moving the cursor to a second location to draw a box around the frames, and releasing the mouse click action to define the shape. Defining the shape functions to select frames positioned wholly or partially within a boundary of the shape. The input to initiate the multi-edit mode may also include an additional action, such as a keyboard input (e.g., pressing <enter>), selecting a displayed menu action, or some other combination of one or more actions provided via one or more input components.

In another example, the input to initiate the multi-edit mode may include a designer selection of single frame (e.g., the frame 10) and/or the selection of a single object (e.g., the object A1). In this example, the computing device is configured to automate a process of identifying similar or linked nodes (frames/objects) to the selected frame/object to be edited together in the multi-edit mode, as discussed above in relation to blocks 104 and 110, for example.

Figure 4:
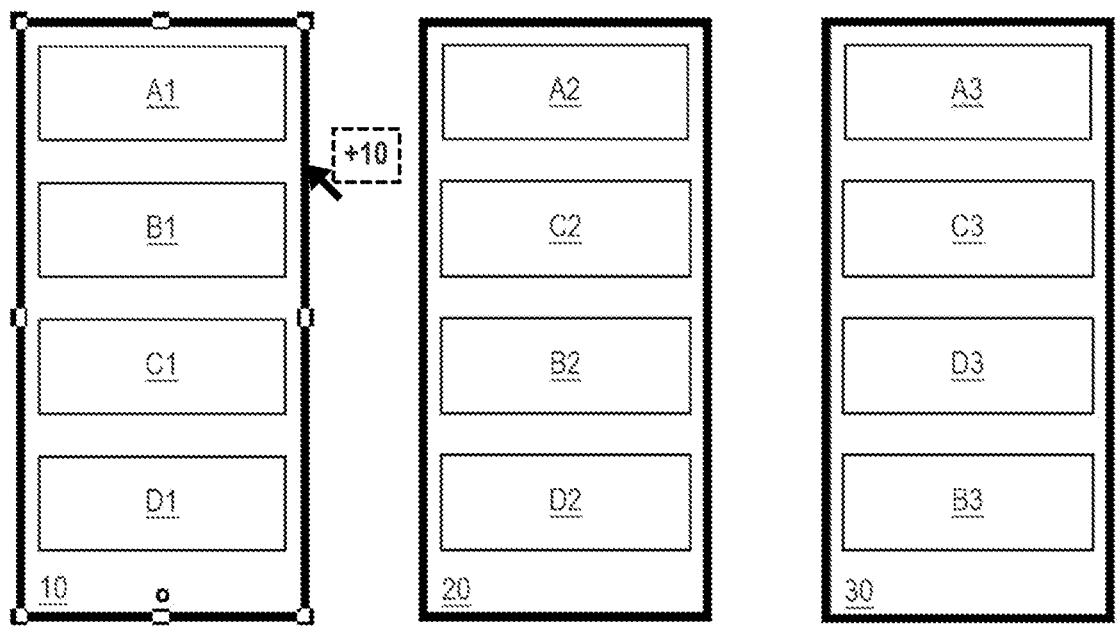
FIG. 4 illustrates an example including an arrangement of frames and objects and an indicator of the multi-edit mode.

FIG. 4 illustrates an example including an arrangement of frames and objects and an indicator of the multi-edit mode. FIG. 4 includes the arrangement of frames and objects as in FIG. 3, and with the indicator in the form of highlighted borders around the selected frames 10, 20, 30. FIG. 4 further includes another indicator in the form of blocks spaced around a border of frame 10 to indicate that frame 10 is the primary focused frame. In addition, a cursor hovering over or selecting frame 10 causes a match count to be displayed. In this example, the match count is ten, which indicates that the computing device has automatically selected seven other frames that are not displayed in the current view, but that will be edited together with frames 10, 20, 30.

Figure 5:
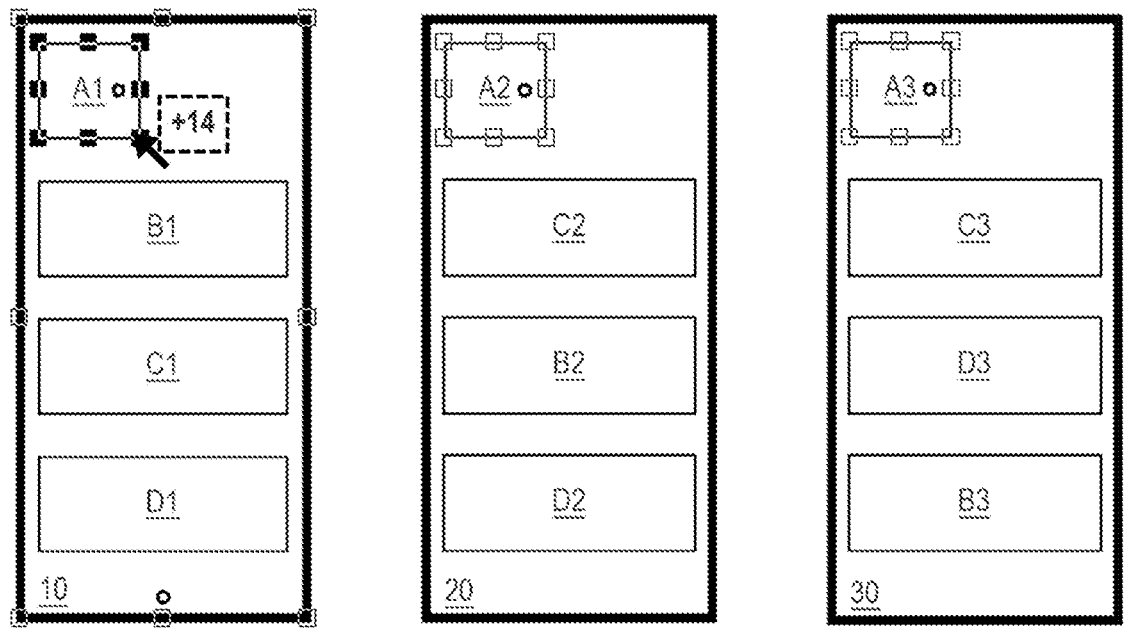
FIG. 5 illustrates an example including an arrangement of frames and objects and edit operations performed on the frames and objects.

FIG. 5 illustrates an example including an arrangement of frames and objects and edit operations performed on the frames and objects. FIG. 5 includes the arrangement of frames and objects as in FIG. 4, and an input to perform an edit operation to edit the object A1 in the primary focused frame 10. In this example, the edit operation on the object A1 is to resize the object. FIG. 5 illustrates that the design tool has performed the resizing operation on the object A1, and has also performed a like resizing operation on the objects A2, A3. A cursor hovering over or selecting the object A1 causes a match count to be displayed. In this example, the match count is fourteen, which indicates that the computing device has automatically selected eleven other objects that are not displayed in the current view, but that have also been edited together with the objects A1, A2, A3. In this example, the computing device identified the fourteen objects based on various criteria, such having the same click position, matching content, corresponding IDs, corresponding order characteristics, and/or corresponding hierarchy characteristic, as discussed above.

Figure 6:
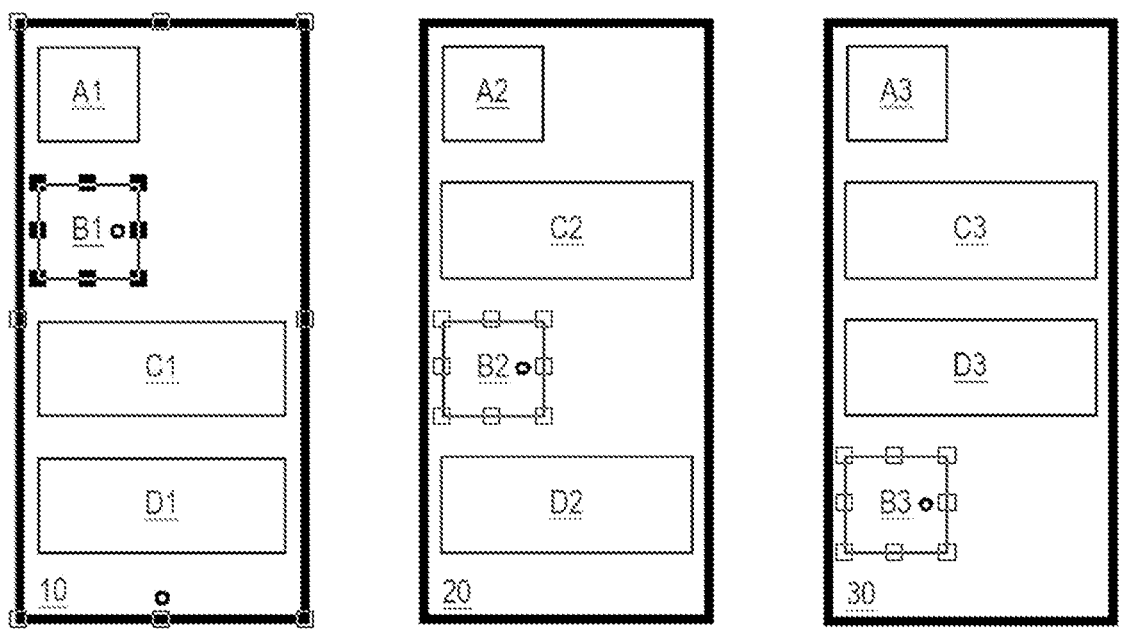
FIG. 6 illustrates an example including an arrangement of frames and objects and edit operations performed on the frames and objects.

FIG. 6 illustrates an example including an arrangement of frames and objects and edit operations performed on the frames and objects. FIG. 6 includes the arrangement of frames and objects as in FIG. 5, and an input to perform an edit operation to edit the object B1 in the primary focused frame 10. In this example, the edit operation on the object B1 is to resize the object. FIG. 6 illustrates that the design tool has performed the resizing operation on the object B1, and has also performed a like resizing operation on the objects B2, B3. A cursor is omitted in FIG. 6 but could likewise cause a match count to be displayed, as discussed above. In this example, the computing device identified at least the objects B1, B2, B3 based on various criteria, such having matching content, corresponding IDs, corresponding order characteristics, and/or corresponding hierarchy characteristic, as discussed above. FIG. 6 illustrates an example where objects across different frames can still be linked based on other criteria besides the same click position, and accordingly edited together.

Figure 7:
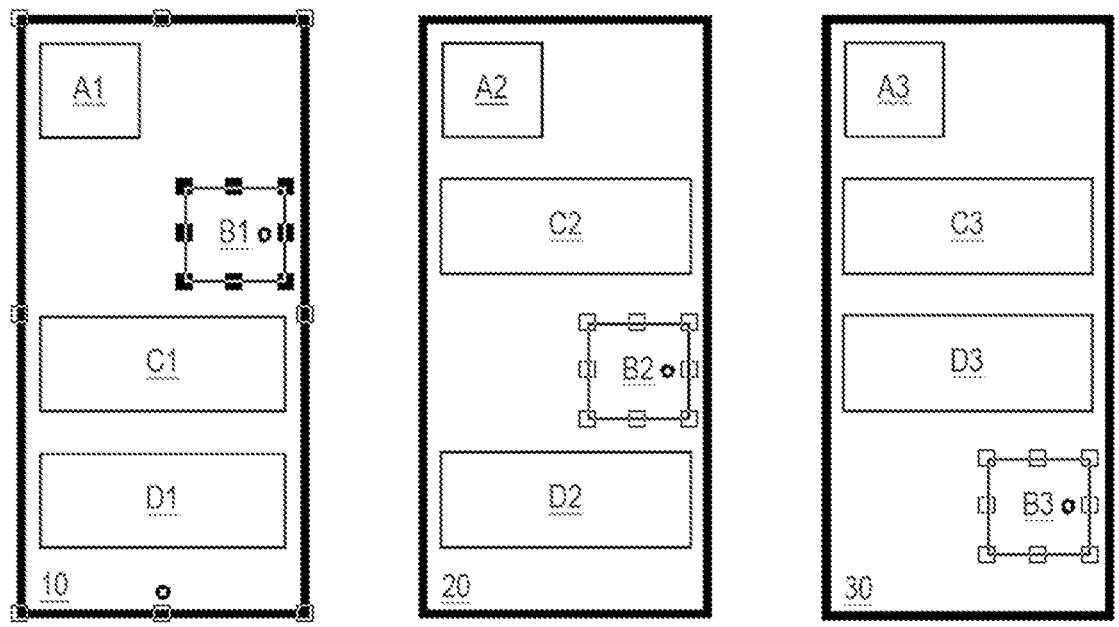
FIG. 7 illustrates an example including an arrangement of frames and objects and edit operations performed on the frames and objects.

FIG. 7 illustrates an example including an arrangement of frames and objects and edit operations performed on the frames and objects. FIG. 7 includes the arrangement of frames and objects as in FIG. 6, and an input to perform an edit operation to edit the object B1 in the primary focused frame 10. In this example, the edit operation on the object B1 is to move the object with respect to the frame 10. FIG. 7 illustrates that the design tool has moved the object B1, and has also moved at least objects B2, B3 in like manner relative to the frames 20, 30, respectively.

Figure 8:
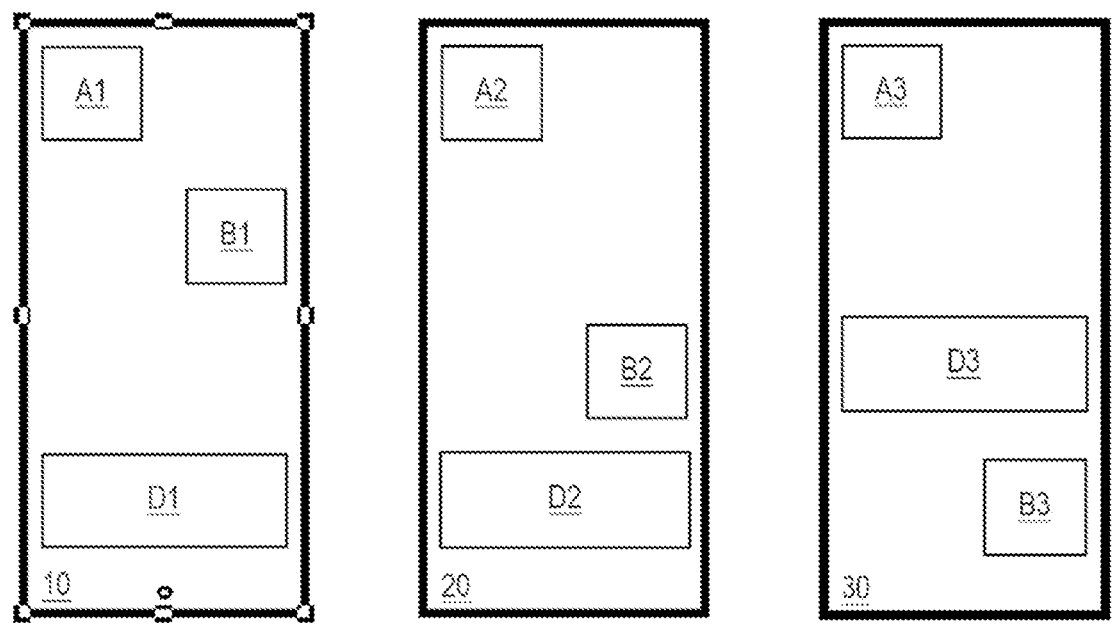
FIG. 8 illustrates an example including an arrangement of frames and objects and edit operations performed on the frames and objects.

FIG. 8 illustrates an example including an arrangement of frames and objects and edit operations performed on the frames and objects. FIG. 8 includes the arrangement of frames and objects as in FIG. 7, and an input to perform an edit operation to edit the object C1 in the primary focused frame 10. In this example, the edit operation on the object C1 is to delete the object. FIG. 8 illustrates that the design tool has removed the object C1, and has also removed at least objects C2, C3 from the frames 20, 30, respectively.

Figure 9:
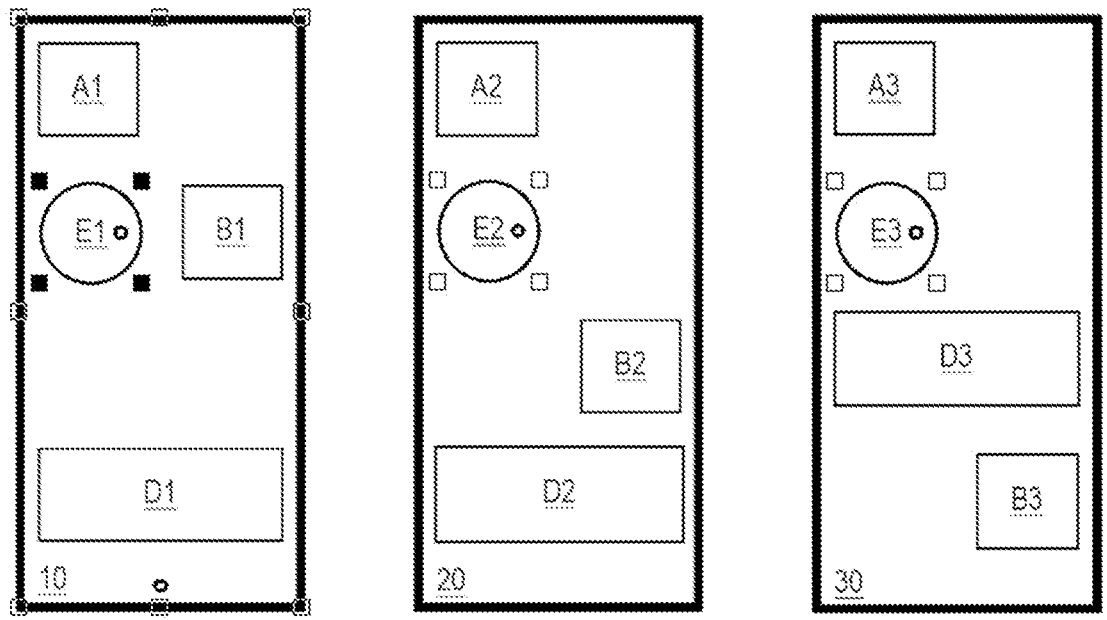
FIG. 9 illustrates an example including an arrangement of frames and objects and edit operations performed on the frames and objects.

FIG. 9 illustrates an example including an arrangement of frames and objects and edit operations performed on the frames and objects. FIG. 9 includes the arrangement of frames and objects as in FIG. 8, and an input to perform an edit operation to edit an object E1 in the primary focused frame 10. In this example, the edit operation on the object E1 is to create and place the object to the left of the object B1. FIG. 9 illustrates that the design tool has created and placed the object E1, and has also created and placed at least objects E2, E3 at like positions in the frames 20, 30, respectively.

Figure 10:
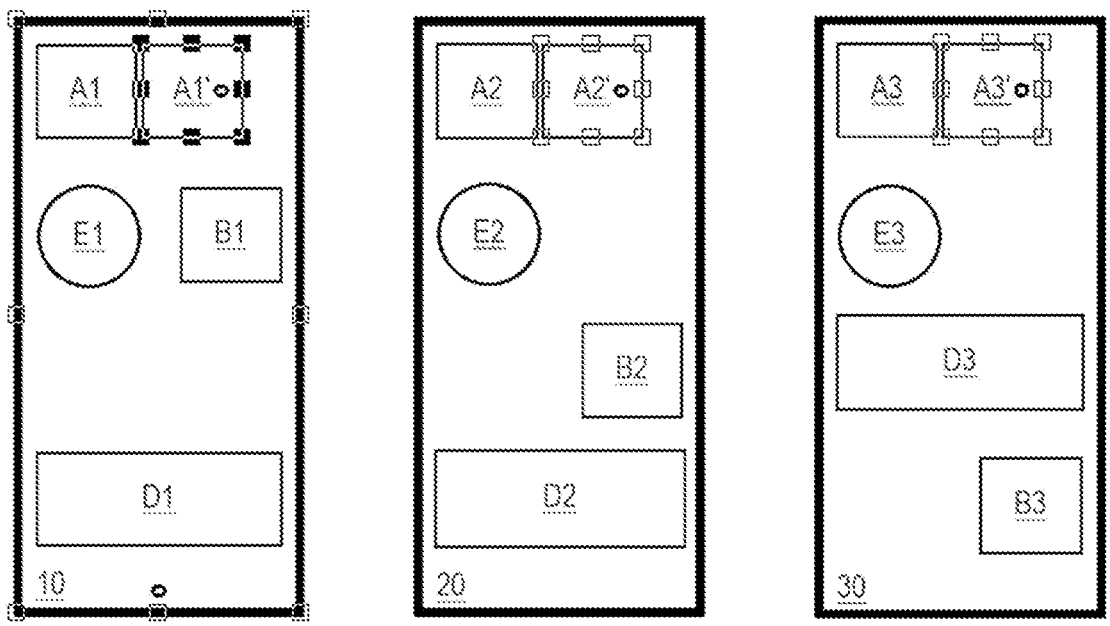
FIG. 10 illustrates an example including an arrangement of frames and objects and edit operations performed on the frames and objects.

FIG. 10 illustrates an example including an arrangement of frames and objects and edit operations performed on the frames and objects. FIG. 10 includes the arrangement of frames and objects as in FIG. 9, and an input to perform an edit operation to edit the object A1 in the primary focused frame 10. In this example, the edit operation on the object A1 is to duplicate and add a copy of the object A1. FIG. 10 illustrates that the design tool has created and placed an object A1' that is a duplicate of the object A1, and has also created and placed at least objects A2', A3' that are duplicates of the objects A2, A3 in the frames 20, 30, respectively.

Figure 11:
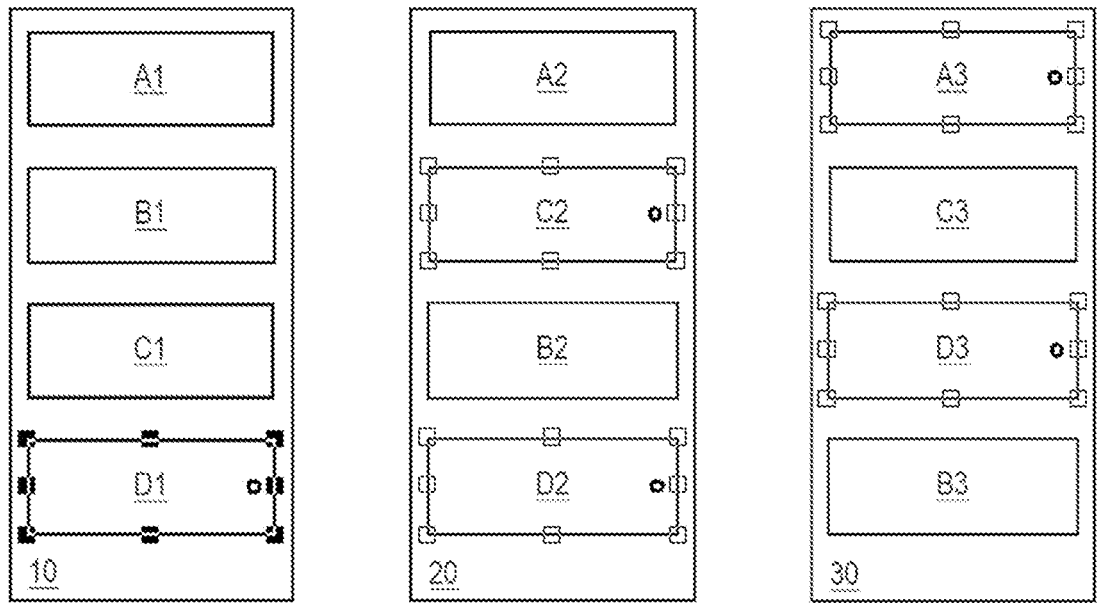
FIG. 11 illustrates an example including an arrangement of frames and objects and an input to initiate a multi-edit mode.
Figure 12:
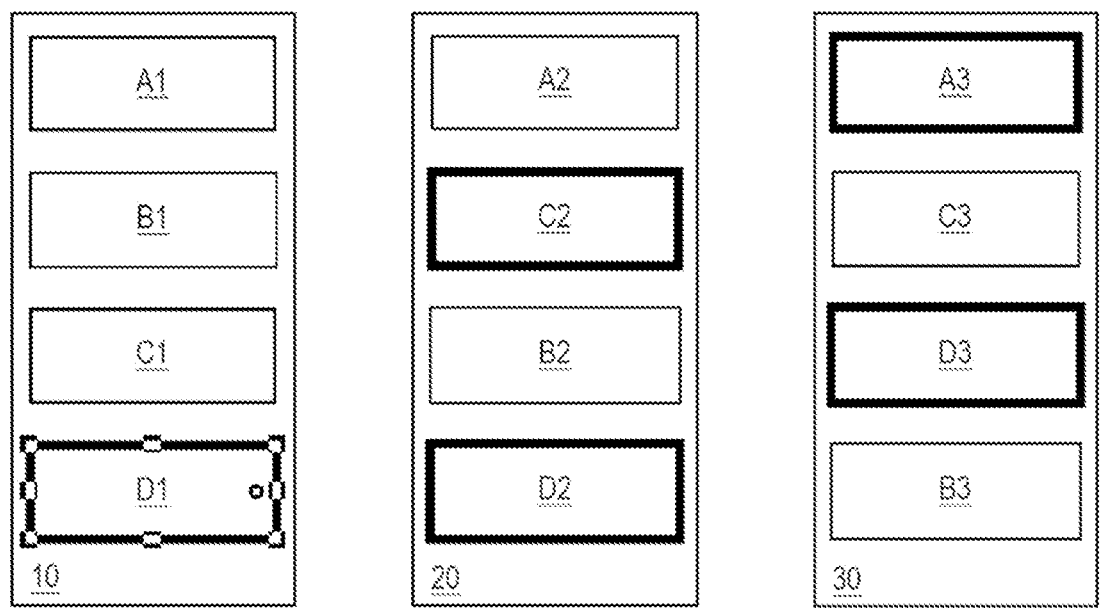
FIG. 12 illustrates an example including an arrangement of frames and objects and an indicator of the multi-edit mode.

FIG. 11 illustrates an example including an arrangement of frames and objects and an input to initiate a multi-edit mode. FIG. 11 includes an arrangement of frames and objects as in FIG. 3, and illustrates an input to select one or more objects and/or nested frames within a single frame and across multiple frames. More particularly, FIG. 11 illustrates a selection of objects A3, C2, D1, D2, D3. The input to initiate the multi-edit mode may also include an additional action, such as a keyboard input (e.g., pressing <enter>), selecting a displayed menu action, or some other combination of one or more actions provided via one or more input components to confirm the selection of frames/objects an initiate the multi-edit mode. FIG. 12 illustrates an example including an arrangement of frames and objects and an indicator of the multi-edit mode. FIG. 12 includes the arrangement of frames and objects as in FIG. 11, and with the indicator in the form of highlighted borders around the selected objects/nested frames A3, C2, D1, D2, D3.

Figure 13:
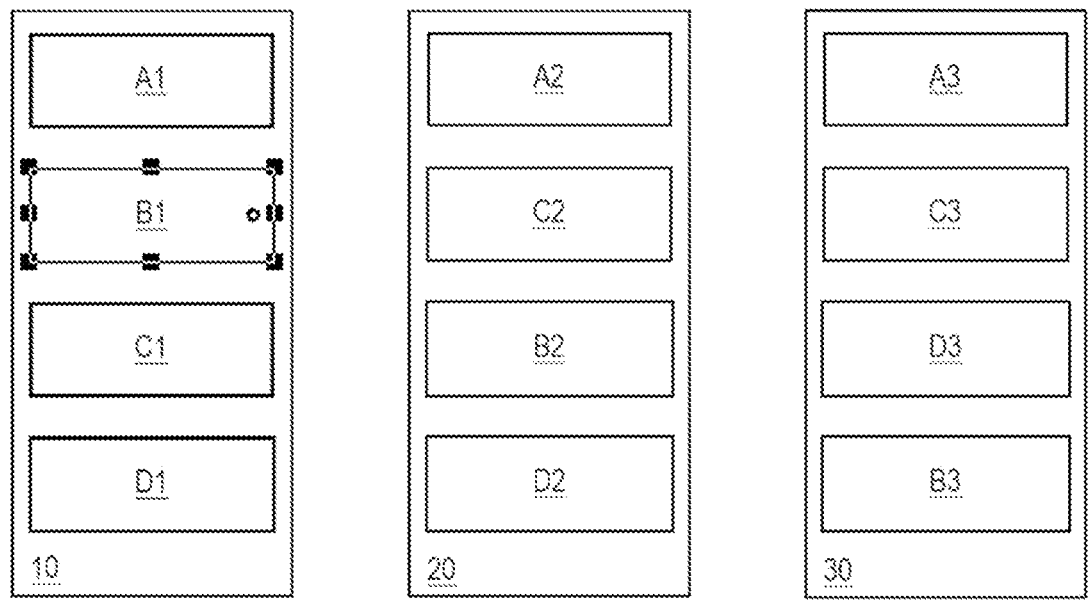
FIG. 13 illustrates an example including an arrangement of frames and objects and an input to select a single object/frame.
Figure 14:
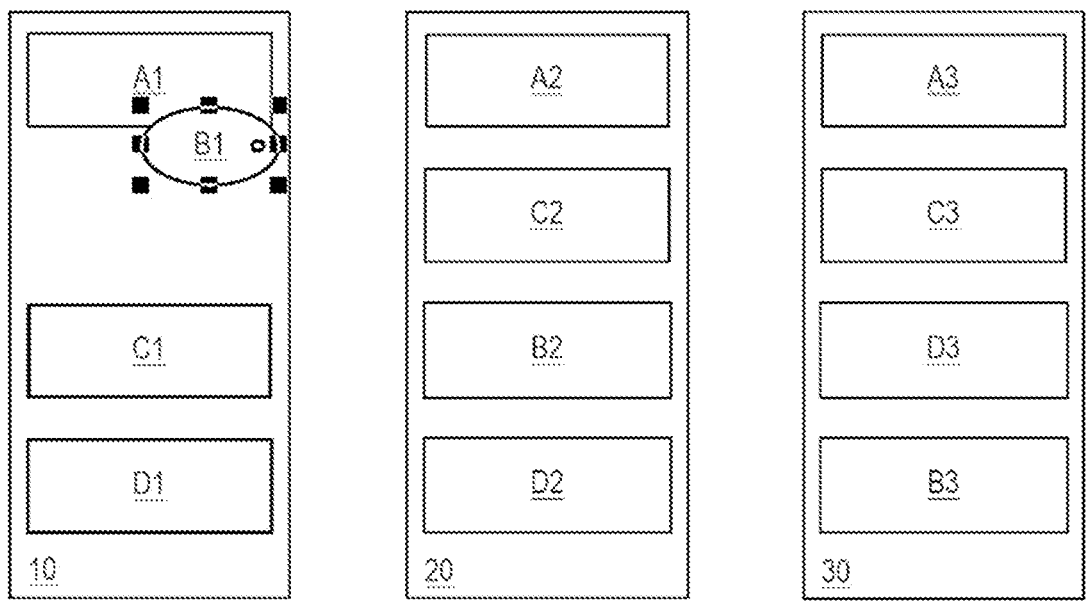
FIG. 14 illustrates an example including an arrangement of frames and objects and an edit operation performed on the arrangement.

FIG. 13 illustrates an example including an arrangement of frames and objects and an input to select a single object. FIG. 13 includes an arrangement of frames and objects/nested frames as in FIG. 3, and illustrates an input to select the object B1. FIG. 14 illustrates an example including an arrangement of frames and objects and an edit operation performed on the arrangement. FIG. 14 includes the arrangement of frames and objects as in FIG. 13, and an input to perform an edit operation to edit the object B1 in the frame 10. In this example, the edit operation on the object B1 is to change the shape of the object, resize the object, and move the object. The edit operation may also include other edits, such as changing a color or fill pattern and/or adding or editing text in the object B1.

Figure 15:
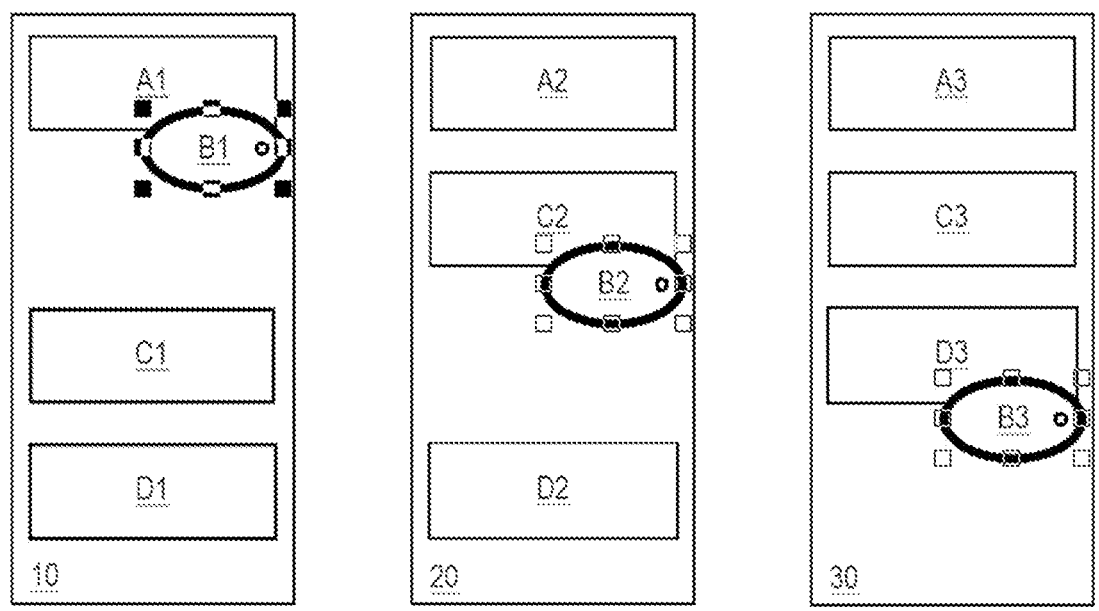
FIG. 15 illustrates an example including an arrangement of frames and objects and an edit operation replicated across multiple frames.

FIG. 15 illustrates an example including an arrangement of frames and objects and an edit operation replicated across multiple frames. FIG. 15 illustrates that the design tool has performed the edit operation of FIG. 14 on the object B1, and has also performed like edit operations on the objects B2, B3 in the frames 20, 30, respectively. FIG. 13, FIG. 14, and FIG. 15 illustrate an example according to the flowchart 200 of FIG. 2.

Hardware Overview

Figure 16:
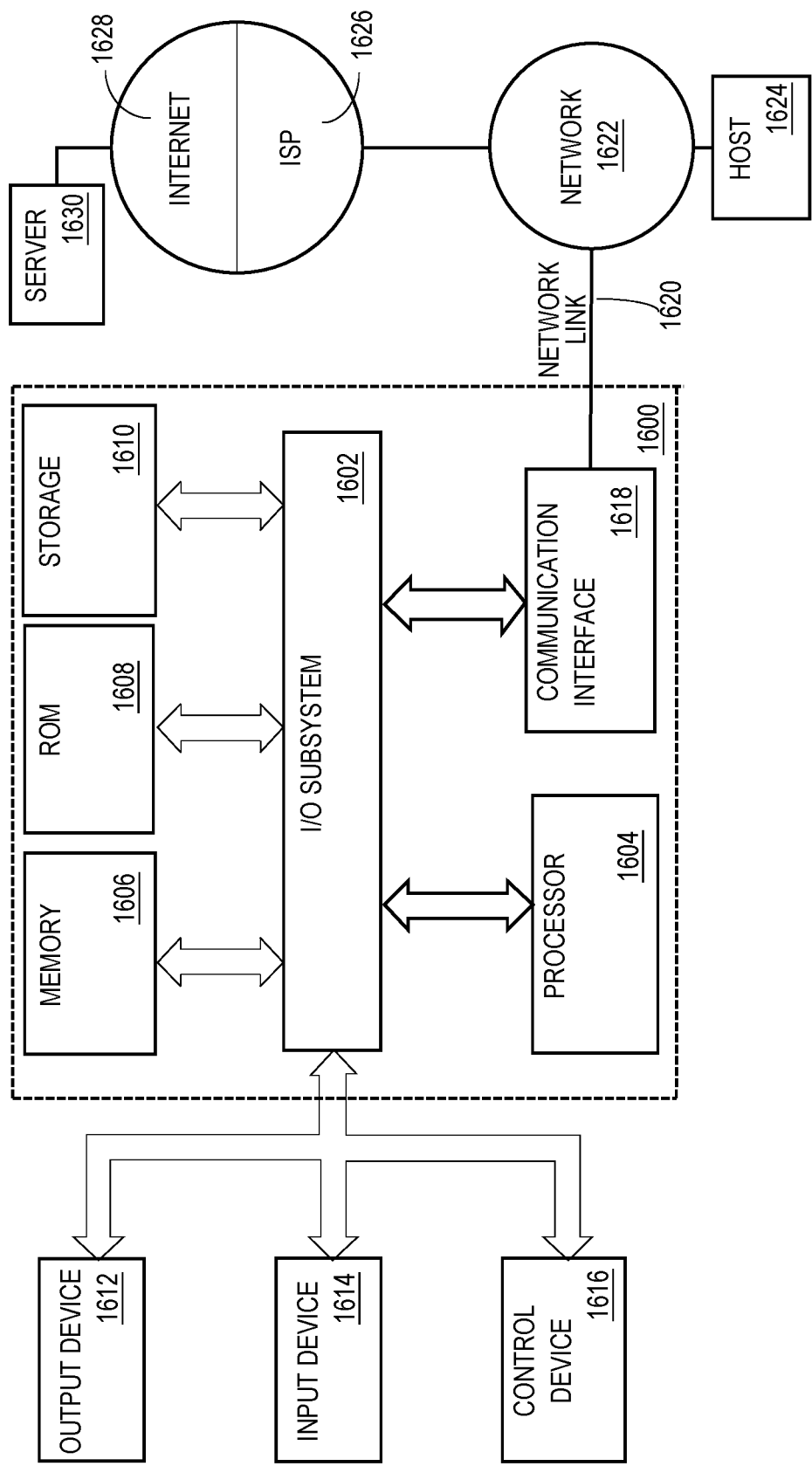
FIG. 16 is a block diagram of a computing device in which the present disclosure may be embodied.

Referring now to FIG. 16, it is a block diagram that illustrates a basic computing device 1600 in which the example embodiment(s) of the present disclosure may be embodied. Computing device 1600 and its components, including their connections, relationships, and functions, is meant to be illustrative, and not meant to limit implementations of the example embodiment(s). Other computing devices suitable for implementing the example embodiment(s) may have different components, including components with different connections, relationships, and functions.

Computing device 1600 may include a bus 1602 or other communication mechanism for addressing main memory 1606 and for transferring data between and among the various components of device 1600.

Computing device 1600 may also include one or more hardware processors 1604 coupled with bus 1602 for processing information. A hardware processor 1604 may be a general purpose microprocessor, a system on a chip (SoC), or other processor.

Main memory 1606, such as a random access memory (RAM) or other dynamic storage device, also may be coupled to bus 1602 for storing information and software instructions to be executed by processor(s) 1604. Main memory 1606 also may be used for storing temporary variables or other intermediate information during execution of software instructions to be executed by processor(s) 1604.

Software instructions, when stored in storage media accessible to processor(s) 1604, render computing device 1600 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 1600 also may include read only memory (ROM) 1608 or other static storage device coupled to bus 1602 for storing static information and software instructions for processor(s) 1604.

One or more mass storage devices 1610 may be coupled to bus 1602 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 1610 (e.g., the main hard disk for the device) stores a body of program and data for directing operation of the computing device, including an operating system, user application programs, driver and other support files, as well as other data files of all sorts.

Computing device 1600 may be coupled via bus 1602 to display 1612, such as a liquid crystal display (LCD) or other electronic visual display, for displaying information to a computer user. In some configurations, a touch sensitive surface incorporating touch detection technology (e.g., resistive, capacitive, etc.) may be overlaid on display 1612 to form a touch sensitive display for communicating touch gesture (e.g., finger or stylus) input to processor(s) 1604.

An input device 1614, including alphanumeric and other keys, may be coupled to bus 1602 for communicating information and command selections to processor 1604. In addition to or instead of alphanumeric and other keys, input device 1614 may include one or more physical buttons or switches such as, for example, a power (on/off) button, a "home" button, volume control buttons, or the like.

Another type of user input device may be a cursor control device 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

While in some configurations, such as the configuration depicted in FIG. 16, one or more of display 1612, input device 1614, and cursor control 1616 are external components (i.e., peripheral devices) of computing device 1600, some or all of display 1612, input device 1614, and cursor control 1616 are integrated as part of the form factor of computing device 1600 in other configurations.

Functions of the disclosed systems, methods, and modules may be performed by computing device 1600 in response to processor(s) 1604 executing one or more programs of software instructions contained in main memory 1606. Such software instructions may be read into main memory 1606 from another storage medium, such as storage device(s) 1610. Execution of the software instructions contained in main memory 1606 cause processor(s) 1604 to perform the functions of the example embodiment(s).

While functions and operations of the example embodiment(s) may be implemented entirely with software instructions, hard-wired or programmable circuitry of computing device 1600 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 1610. Volatile media includes dynamic memory, such as main memory 1606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more software instructions to processor(s) 1604 for execution. For example, the software instructions may initially be carried on a magnetic disk or solid-state drive of a remote computer. The remote computer can load the software instructions into its dynamic memory and send the software instructions over a telephone line using a modem. A modem local to computing device 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor(s) 1604 retrieves and executes the software instructions. The software instructions received by main memory 1606 may optionally be stored on storage device(s) 1610 either before or after execution by processor(s) 1604.

Computing device 1600 also may include one or more communication interface(s) 1618 coupled to bus 1602. A communication interface 1618 provides a two-way data communication coupling to a wired or wireless network link 1620 that is connected to a local network 1622 (e.g., Ethernet network, Wireless Local Area Network, cellular phone network, Bluetooth wireless network, or the like). Communication interface 1618 sends and receives electrical, electromagnetic, or optical signals that carry digital data streams representing various types of information. For example, communication interface 1618 may be a wired network interface card, a wireless network interface card with an integrated radio antenna, or a modem (e.g., ISDN, DSL, or cable modem).

Network link(s) 1620 typically provide data communication through one or more networks to other data devices. For example, a network link 1620 may provide a connection through a local network 1622 to a host computer 1624 or to data equipment operated by an Internet Service Provider (ISP) 1626. ISP 1626 in turn provides data communication services through the world wide packet data communication network now commonly referred to as the "Internet" 1628. Local network(s) 1622 and Internet 1628 use electrical, electromagnetic or optical signals that carry digital data streams. The signals through the various networks and the signals on network link(s) 1620 and through communication interface(s) 1618, which carry the digital data to and from computing device 1600, are example forms of transmission media.

Computing device 1600 can send messages and receive data, including program code, through the network(s), network link(s) 1620 and communication interface(s) 1618. In the Internet example, a server 1630 might transmit a requested code for an application program through Internet 1628, ISP 1626, local network(s) 1622 and communication interface(s) 1618.

The received code may be executed by processor 1604 as it is received, and/or stored in storage device 1610, or other non-volatile storage for later execution.

Software Overview

Figure 17:
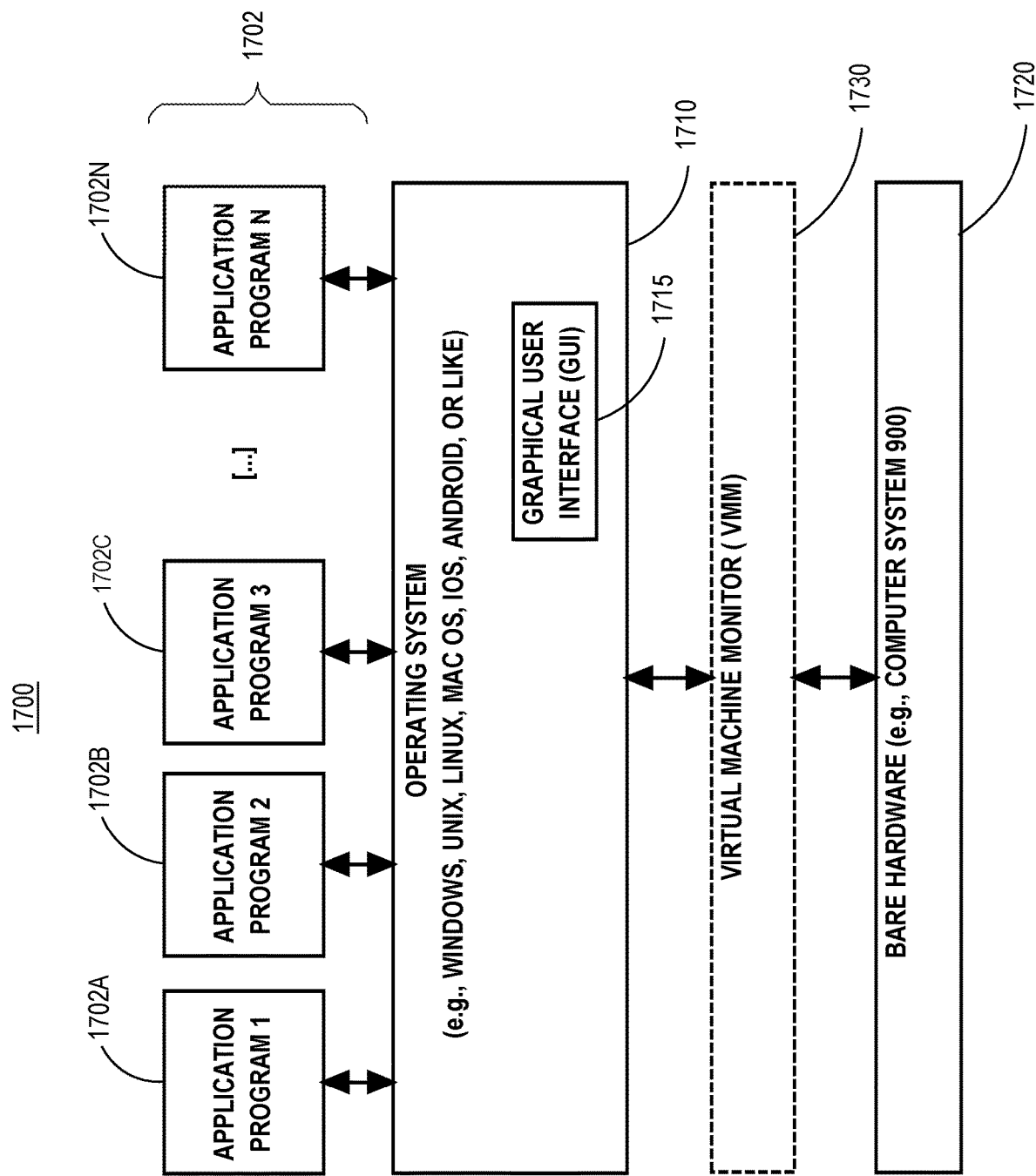
FIG. 17 is a block diagram of a basic software system for controlling the operation of the computing device.

FIG. 17 is a block diagram of a basic software system 1700 that may be employed for controlling the operation of computing device 1600. Software system 1700 and its components, including their connections, relationships, and functions, is meant to be illustrative, and not meant to limit implementations of the example embodiment(s). Other software systems suitable for implementing the example embodiment(s) may have different components, including components with different connections, relationships, and functions.

Software system 1700 is provided for directing the operation of computing device 1600. Software system 1700, which may be stored in system memory (RAM) 1606 and on fixed storage (e.g., hard disk or flash memory) 1610, includes a kernel or operating system (OS) 1710.

The OS 1710 manages low-level aspects of computer operation, including managing execution of processes, memory allocation, file input and output (I/O), and device I/O. One or more application programs, represented as 1702A, 1702B, 1702C . . . 1702N, may be "loaded" (e.g., transferred from fixed storage 1610 into memory 1606) for execution by the system 1700. The applications or other software intended for use on device 1600 may also be stored as a set of downloadable computer-executable instructions, for example, for downloading and installation from an Internet location (e.g., a Web server, an app store, or other online service).

Software system 1700 includes a graphical user interface (GUI) 1715, for receiving user commands and data in a graphical (e.g., "point-and-click" or "touch gesture") fashion. These inputs, in turn, may be acted upon by the system 1700 in accordance with instructions from operating system 1710 and/or application(s) 1702. The GUI 1715 also serves to display the results of operation from the OS 1710 and application(s) 1702, whereupon the user may supply additional inputs or terminate the session (e.g., log off).

OS 1710 can execute directly on the bare hardware 1720 (e.g., processor(s) 1604) of device 1600. Alternatively, a hypervisor or virtual machine monitor (VMM) 1730 may be interposed between the bare hardware 1720 and the OS 1710. In this configuration, VMM 1730 acts as a software "cushion" or virtualization layer between the OS 1710 and the bare hardware 1720 of the device 1600.

VMM 1730 instantiates and runs one or more virtual machine instances ("guest machines"). Each guest machine comprises a "guest" operating system, such as OS 1710, and one or more applications, such as application(s) 1702, designed to execute on the guest operating system. The VMM 1730 presents the guest operating systems with a virtual operating platform and manages the execution of the guest operating systems.

In some instances, the VMM 1730 may allow a guest operating system to run as if it is running on the bare hardware 1720 of device 1600 directly. In these instances, the same version of the guest operating system configured to execute on the bare hardware 1720 directly may also execute on VMM 1730 without modification or reconfiguration. In other words, VMM 1730 may provide full hardware and CPU virtualization to a guest operating system in some instances.

In other instances, a guest operating system may be specially designed or configured to execute on VMM 1730 for efficiency. In these instances, the guest operating system is "aware" that it executes on a virtual machine monitor. In other words, VMM 1730 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method comprising:
   causing a display device to display:
      a design interface used to edit design layouts,
         within the design interface, a particular design layout defined in at least one document, wherein the particular design layout includes at least a first frame and a second frame,
         within the first frame, a first node whose definition is located at a first location within the at least one document,
         within the second frame, a second node whose definition is located at a second location within the at least one document, wherein the first location is different from the second location;
   receiving first input to initiate a multi-edit mode in the design interface;
   receiving second input to perform a first operation to edit the first node in the first frame;
   wherein the first operation to edit is at least one of:
      a modification to one or more of a shape, size, color, or style of the first node;
      a modification to a position of the first node with respect to the first frame; or
      a duplication of at least a portion of the first node and placement of the duplicated portion at a position with respect to the first frame;
   identifying, based at least in part on the first node, the second node in the second frame, wherein the second node corresponds to the first node in the first frame; and
   performing, based at least in part on the second input, the first operation to edit the first node in the first frame and a second operation to edit the second node in the second frame, wherein the second operation to edit is the same as the first operation to edit;
   storing in the at least one document at a third location data that reflects changes made by the first operation; and
   storing in the at least one document at a fourth location data that reflects changes made by the second operation.

2. The method of claim 1, further comprising, based at least in part on the first input, causing the display device to display the design interface including an indicator that the multi-edit mode is activated to edit together the first frame and the second frame, and wherein the indicator includes a match count of a number of other nodes to be edited together in the multi-edit mode.

3. The method of claim 1, further comprising causing the display device to display the design interface including the first frame with the first operation performed on the first node and the second frame with the second operation performed on the second node.

4. The method of claim 1, wherein the first input includes a selection of the first frame and the second frame.

5. The method of claim 1, wherein the first input includes a selection of the first node in the first frame and a selection of a multi-edit mode command to edit the first frame and the second frame together.

6. The method of claim 1, wherein the first frame is on a first page or document and the second frame is on a different second page or document.

7. The method of claim 1, the method further comprising:
   receiving a third input to perform a third operation to edit the first node in the first frame;

wherein the third operation to edit is a modification to two or more of the shape, size, color, style, or position of the first node;

performing the third operation to edit the first node;

receiving fourth input to initiate a multi-edit mode in the design interface based at least in part on the third input;

identifying, based at least in part on the fourth input, a plurality of third nodes across one or more design interfaces, wherein each node of the plurality of third nodes corresponds to the first node in the first frame; and performing, based at least in part on the fourth input, a plurality of fourth operations to edit the plurality of third nodes across the one or more design interfaces, wherein the fourth operations to edit are the same, proportionally or relatively, as the first operation to edit.

8. The method of claim 7, wherein identifying the plurality of third nodes that corresponds to the first node is based on criteria including, one or more of:

the first node at a first position relative to the first frame, a particular third node of the plurality of third nodes at a third position relative to a respective third frame, and the first position corresponding with the third position;

the first node and a particular third node of the plurality of third nodes having one or more of corresponding identifiers, corresponding order characteristics, or corresponding hierarchy characteristics; or the first node and a particular third node of the plurality of third nodes including, at least in part, matching content.

9. The method of claim 1, wherein the first node is at a first position relative to the first frame, the second node is at a second position relative to the second frame, and the second position relative to the second frame is different from the first position relative to the first frame;

wherein identifying the second node in the second frame is based on criteria including the first node and the second node having one or more of corresponding identifiers, corresponding order characteristics, or corresponding hierarchy characteristics; and wherein the second operation to edit is the same, proportionally or relatively, as the first operation to edit.

10. The method of claim 1, wherein identifying the second node in the second frame is based on criteria including at least one of:

the first node being at a first position relative to the first frame, the second node being at a second position relative to the second frame, and the first position corresponding with the second position;

the first node and the second node having one or more of corresponding identifiers, corresponding order characteristics, or corresponding hierarchy characteristics;

the first node and the second node including, at least in part, matching content;

the first node and the second node including, at least in part, common edit history; or the first node and the second node including, at least in part, common duplication history.

11. The method of claim 1, wherein the first location is the third location, and wherein the second location is the fourth location.

12. A method comprising:

causing a display device to display a design interface used to edit a design layout, wherein the design layout includes at least a first frame and a second frame;

receiving first input to initiate a multi-edit mode in the design interface;

receiving second input to perform a first operation to edit a first node in the first frame;

wherein the first operation to edit is at least one of:
a modification to one or more of a shape, size, color, or style of the first node;
a modification to a position of the first node with respect to the first frame; or
a duplication of at least a portion of the first node and placement of the duplicated portion at a position with respect to the first frame;

identifying, based at least in part on the first node, a second node in the second frame, wherein the second node corresponds to the first node in the first frame;

wherein identifying the second node in the second frame is based on criteria including the first node at a first position relative to the first frame, the second node at a second position relative to the second frame, and the first position corresponding with the second position;

performing, based at least in part on the second input, the first operation to edit the first node in the first frame and a second operation to edit the second node in the second frame, wherein the second operation to edit is the same as the first operation to edit.

13. One or more non-transitory computer-readable storage medium storing instructions that, when executed by one or more processors, cause the one or more processors to perform functions comprising:

causing a display device to display:
a design interface used to edit design layouts,
within the design interface, a particular design layout defined in at least one document, wherein the particular design layout includes at least a first frame and a second frame,
within the first frame, a first node whose definition is located at a first location within the at least one document,
within the second frame, a second node whose definition is located at a second location within the at least one document, wherein the first location is different from the second location;

receiving first input to initiate a multi-edit mode in the design interface;

receiving second input to perform a first operation to edit the first node in the first frame;

wherein the first operation to edit is at least one of:
a modification to one or more of a shape, size, color, or style of the first node;
a modification to a position of the first node with respect to the first frame; or
a duplication of at least a portion of the first node and placement of the duplicated portion at a position with respect to the first frame;

identifying, based at least in part on the first node, the second node in the second frame, wherein the second node corresponds to the first node in the first frame; and performing, based at least in part on the second input, the first operation to edit the first node in the first frame and a second operation to edit the second node in the second frame;

storing in the at least one document at a third location data that reflects changes made by the first operation; and storing in the at least one document at a fourth location data that reflects changes made by the second operation.

14. The one or more non-transitory computer-readable storage medium of claim 13, wherein the functions further include, based at least in part on the first input, causing the display device to display the design interface including an indicator that the multi-edit mode is activated to edit together the first frame and the second frame, and wherein the indicator includes a match count of a number of other nodes to be edited together in the multi-edit mode.

15. The one or more non-transitory computer-readable storage medium of claim 13, wherein the functions further include causing the display device to display the design interface including the first frame with the first operation performed on the first node and the second frame with the second operation performed on the second node.

16. The one or more non-transitory computer-readable storage medium of claim 13, wherein the function of identifying the second node in the second frame is based on criteria including, one or more of:
the first node at a first position relative to the first frame, the second node at a second position relative to the second frame, and the first position corresponding with the second position; or
the first node and the second node having one or more of corresponding identifiers, corresponding order characteristics, or corresponding hierarchy characteristics.

17. The one or more non-transitory computer-readable storage medium of claim 13, wherein the first input includes a selection of the first frame and the second frame.

18. The one or more non-transitory computer-readable storage medium of claim 13, wherein the first input includes a selection of the first node in the first frame and a selection of a multi-edit mode command to edit the first frame and the second frame together.

19. The one or more non-transitory computer-readable storage medium of claim 13, wherein the first frame is on a first page or document and the second frame is on a different second page or document.

20. The one or more non-transitory computer-readable storage medium of claim 13, wherein the functions further comprise:
receiving a third input to perform a third operation to edit the first node in the first frame;
wherein the third operation to edit is a modification to two or more of the shape, size, color, style, or position of the first node;
performing the third operation to edit the first node;
receiving fourth input to initiate a multi-edit mode in the design interface based at least in part on the third input;
identifying, based at least in part on the fourth input, a plurality of third nodes across one or more design interfaces, wherein each node of the plurality of third nodes corresponds to the first node in the first frame; and
performing, based at least in part on the fourth input, a plurality of fourth operations to edit the plurality of third nodes across the one or more design interfaces, wherein the fourth operations to edit are the same, proportionally or relatively, as the first operation to edit.

21. The one or more non-transitory computer-readable storage medium of claim 20, wherein the function of identifying the plurality of third nodes that corresponds to the first node is based on criteria including, one or more of:
the first node at a first position relative to the first frame, a particular third node of the plurality of third nodes at a third position relative to a respective third frame, and the first position corresponding with the third position;
the first node and a particular third node of the plurality of third nodes having one or more of corresponding identifiers, corresponding order characteristics, or corresponding hierarchy characteristics; or
the first node and a particular third node of the plurality of third nodes including, at least in part, matching content.

22. The one or more non-transitory computer-readable storage medium of claim 13,
wherein the first node is at a first position relative to the first frame, the second node is at a second position relative to the second frame, and the second position relative to the second frame is different from the first position relative to the first frame;
wherein identifying the second node in the second frame is based on criteria including the first node and the second node having one or more of corresponding identifiers, corresponding order characteristics, or corresponding hierarchy characteristics; and
wherein the second operation to edit is the same, proportionally or relatively, as the first operation to edit.

* * * * *